United States Patent
Simpson et al.

(10) Patent No.: US 10,152,552 B2
(45) Date of Patent: Dec. 11, 2018

(54) ANALYZING A STRUCTURE OF A WEB APPLICATION TO PRODUCE ACTIONABLE TOKENS

(71) Applicant: ENTIT SOFTWARE LLC, Sanford, NC (US)

(72) Inventors: Shawn Morgan Simpson, Alpharetta, GA (US); Kirill Mendelev, Alpharetta, GA (US); David Scott Tillery, Alpharetta, GA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 276 days.

(21) Appl. No.: 14/762,939

(22) PCT Filed: Jan. 29, 2013

(86) PCT No.: PCT/US2013/023655
§ 371 (c)(1),
(2) Date: Jul. 23, 2015

(87) PCT Pub. No.: WO2014/120128
PCT Pub. Date: Aug. 7, 2014

(65) Prior Publication Data
US 2016/0078146 A1   Mar. 17, 2016

(51) Int. Cl.
*G06F 17/30* (2006.01)
*G06F 21/51* (2013.01)
(Continued)

(52) U.S. Cl.
CPC .......... *G06F 17/30896* (2013.01); *G06F 8/38* (2013.01); *G06F 17/2247* (2013.01);
(Continued)

(58) Field of Classification Search
CPC ................................ G06F 17/30; G06F 17/22
See application file for complete search history.

(56) References Cited

U.S. PATENT DOCUMENTS 6,687,874 B2  2/2004  Burgess
7,039,899 B1  5/2006  Quiroga
(Continued)

FOREIGN PATENT DOCUMENTS

CN  101529362 B  9/2009
CN  101689200 A  3/2010
(Continued)

OTHER PUBLICATIONS

Auger, R., Web Application Security Scanner Evaluation Criteria, Retrieved from the Internet: <http://projects.webappsec.org/w/page/13246986/Web%20Application%20Security%20Scanner%20Evaluation%20Criteria> [retrieved Jan. 8, 2013], 17 pages.
(Continued)

*Primary Examiner* — Scott T Baderman
*Assistant Examiner* — Sookil J Lee

(57) ABSTRACT

Example embodiments disclosed herein relate to analyzing a web application. A web application is loaded. User actions are simulated on user interface elements of the web application. A structure of the web application is traversed based on rules to determine a set of actionable tokens. The respective actionable tokens include a portion of the web application that can change a user interface presented based on the web application.

13 Claims, 4 Drawing Sheets

(51) Int. Cl.
   *G06F 8/38* (2018.01)
   *G06F 17/22* (2006.01)
   *G06F 9/455* (2018.01)

(52) U.S. Cl.
   CPC .............. *G06F 21/51* (2013.01); *G06F 9/455* (2013.01); *G06F 2221/033* (2013.01); *G06F 2221/2119* (2013.01)

(56) References Cited

U.S. PATENT DOCUMENTS

| | | | |
|---|---|---|---|
| 7,054,952 B1* | 5/2006 | Schwerdtfeger | G06F 17/30011 709/246 |
| 7,343,364 B2* | 3/2008 | Bram | G06N 5/043 706/46 |
| 7,552,109 B2 | 6/2009 | Balasubramanian et al. | |
| 7,552,116 B2* | 6/2009 | Chang | G06F 17/243 |
| 7,913,163 B1 | 3/2011 | Zunger | |
| 8,332,763 B2 | 12/2012 | Zhang | |
| 8,555,391 B1 | 10/2013 | Demir | |
| 8,601,586 B1* | 12/2013 | Boutros | H04L 63/1433 709/217 |
| 8,713,427 B2 | 4/2014 | Im | |
| 8,752,183 B1* | 6/2014 | Heiderich | G06F 21/577 726/22 |
| 8,775,563 B2 | 7/2014 | Allsop | |
| 8,793,806 B1 | 7/2014 | Truong et al. | |
| 9,225,772 B2* | 12/2015 | Lui | H04L 67/10 |
| 9,391,832 B1* | 7/2016 | Song | H04L 29/14 |
| 9,405,833 B2 | 8/2016 | Tuttle | |
| 9,430,652 B1* | 8/2016 | Mattsson | G06F 21/6245 |
| 9,699,142 B1* | 7/2017 | Allen | H04L 63/1433 |
| 9,910,992 B2 | 3/2018 | Simpson | |
| 2002/0010855 A1* | 1/2002 | Reshef | G06F 21/554 713/164 |
| 2003/0120719 A1* | 6/2003 | Yepishin | G06F 17/30899 709/203 |
| 2003/0159063 A1 | 8/2003 | Apfelbaum et al. | |
| 2003/0192026 A1* | 10/2003 | Szepesvary | G06F 8/427 717/100 |
| 2004/0111727 A1 | 6/2004 | Schwarzbauer et al. | |
| 2006/0070075 A1* | 3/2006 | Rodionov | H04L 67/125 718/102 |
| 2006/0279571 A1 | 12/2006 | Mori et al. | |
| 2008/0120305 A1 | 5/2008 | Sima et al. | |
| 2008/0148377 A1 | 6/2008 | Kumar | |
| 2008/0148408 A1 | 6/2008 | Kao et al. | |
| 2009/0271474 A1 | 10/2009 | Fu | |
| 2010/0077483 A1 | 3/2010 | Stolfo | |
| 2010/0094860 A1 | 4/2010 | Lin | |
| 2010/0174774 A1* | 7/2010 | Kern | H04L 29/06 709/203 |
| 2010/0198799 A1 | 8/2010 | Krishnan et al. | |
| 2010/0211865 A1 | 8/2010 | Fanning et al. | |
| 2010/0263051 A1* | 10/2010 | Ngalle | G06F 21/51 726/26 |
| 2010/0293616 A1 | 11/2010 | Young | |
| 2011/0015917 A1 | 1/2011 | Wang et al. | |
| 2011/0078556 A1* | 3/2011 | Prasad | G06F 9/4443 715/234 |
| 2011/0159179 A1 | 6/2011 | Chapman | |
| 2011/0161486 A1 | 6/2011 | Podjarny et al. | |
| 2011/0173526 A1 | 7/2011 | Schwarzbauer et al. | |
| 2011/0214174 A1 | 9/2011 | Herzog | |
| 2011/0239104 A1* | 9/2011 | Prasad | G06F 11/3684 715/234 |
| 2011/0252405 A1 | 10/2011 | Meirman et al. | |
| 2012/0016975 A1 | 1/2012 | Rothschild | |
| 2012/0017274 A1 | 1/2012 | Schrecker | |
| 2012/0023487 A1 | 1/2012 | Letca | |
| 2012/0030305 A1 | 2/2012 | Marquess et al. | |
| 2012/0174075 A1 | 7/2012 | Carteri et al. | |
| 2012/0210236 A1 | 8/2012 | Prasad | |
| 2013/0111595 A1* | 5/2013 | Amit | G06F 21/52 726/25 |
| 2013/0145253 A1* | 6/2013 | Mao | G06F 17/30893 715/234 |
| 2013/0159890 A1* | 6/2013 | Rossi | G06F 11/3608 715/762 |
| 2013/0227396 A1 | 8/2013 | Chinnathambi | |
| 2013/0254548 A1 | 9/2013 | Greene | |
| 2013/0254855 A1* | 9/2013 | Walters | G06F 21/60 726/5 |
| 2014/0075563 A1* | 3/2014 | Simpson | G06F 21/577 726/25 |
| 2014/0082593 A1* | 3/2014 | Alper | G06F 11/3672 717/126 |
| 2014/0123295 A1* | 5/2014 | Kuykendall | G06F 21/577 726/25 |
| 2015/0356302 A1* | 12/2015 | Simpson | G06F 21/577 726/25 |
| 2016/0034690 A1 | 2/2016 | Kejriwal | |
| 2016/0078146 A1 | 3/2016 | Simpson | |
| 2016/0241582 A1 | 8/2016 | Boia | |

FOREIGN PATENT DOCUMENTS

| | | |
|---|---|---|
| CN | 101742031 B | 6/2010 |
| CN | 101808093 B | 8/2010 |
| CN | 102918491 | 2/2012 |
| CN | 102523288 | 6/2012 |
| EP | 1235144 A2 | 8/2002 |
| WO | WO-2006058075 A1 | 6/2006 |
| WO | WO-2007009210 | 1/2007 |

OTHER PUBLICATIONS

Doupe, et al., Enemy of the State: a State-aware Black-box Web Vulnerability Scanner, Retrieved from the Internet: < http://dl.acm.org/citation.cfm?id=2362819 >, Sep. 20, 2012, 16 pages.

IBM, Rational AppScan® Standard Edition, 2009, Version 7.8, Retrieved from the Internet: <http://www.itsecurity.ucla.edu/documents/appscan/standard/AppScan%20Standard%20v7.8%20-%20Full%20User%20Guide.pdf> [retrieved on Jan. 8, 2013], 246 pages.

International Search Report & Written Opinion, Nov. 26, 2013, PCT Patent Application No. PCT/US2013/027634, 10 pages.

International Search Report & Written Opinion, Oct. 28, 2013, PCT Patent Application No. PCT/US2013/023655, 9 pages.

Microsoft, Plan crawling and federation in SharePoint Server 2013; Jul. 16, 2012, Retrieved from the Internet: <http://technet.microsoft.com/en-us/library/jj219577.aspx> [retrieved on Jan. 8, 2013], 6 pages.

Unknown, Sharepoint 2010 Farm and Application Configuration (part 1)—Farm-wide Search Settings & Managing Crawler Impact Rules, Retrieved from the Internet: <http://allcomputers.us/windows_server/sharepoint-2010---farm-and-application-configuration-(part-1)---farm-wide-search-settings---managing-crawler-impact-rules.aspx> [retrieved on Jan. 8, 2013], 4 pages.

Extended European Search Report, EP Application No. 13874102.0, Date: Aug. 1, 2016, pp. 1-10, EPO.

Extended European Search Report, EP Application No. 13875944.4, Date: Aug. 25, 2016, pp. 1-6, EPO.

\* cited by examiner

ANALYZING A STRUCTURE OF A WEB APPLICATION TO PRODUCE ACTIONABLE TOKENS

CROSS-REFERENCE TO RELATED APPLICATION

This application is a national stage application under 35 U.S.C. § 371 of PCT/US2013/023655, filed Jan. 29, 2013.

BACKGROUND

Software security testing is used to identify vulnerabilities in an application such as a Web application. Traditional black-box security testing for Web-based software works by using a security testing application, often referred to as a scanner, which poses as an attacker. The scanner explores an Application Under Test (AUT) by making HTTP requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1:
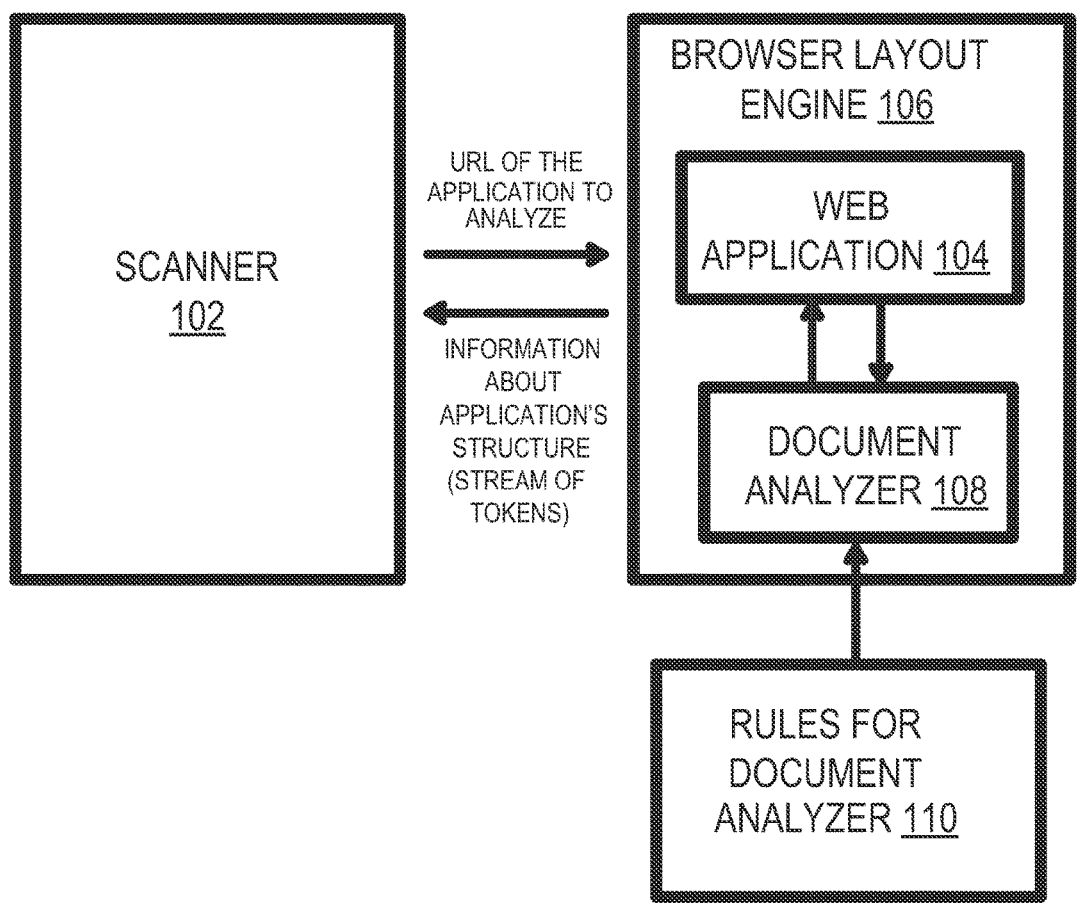
FIG. 1 is a block diagram of a computing system for analyzing the structure of a web application, according to one example.

Embodiments described herein provide techniques for performing testing of applications, such as web applications. When a company desires to know how secure a web application the company has in production is or going to be put into production, the company often uses a security testing solution such as a penetration testing solution (e.g., use of a scanner), fuzz testing, vulnerability testing, software security testing, website security testing, combinations thereof, or the like. The company may wish to use a copy of the application in production as an Application Under Test (AUT).

Automatic dynamic web application security scanners explore the AUT before attacking it. This process can be termed "crawling." Crawling of an AUT can be done through analysis of web application's HyperText Markup Language (HTML) and executing the AUT's code within a controlled environment of a web browser layout engine, for example, a web browser layout engine embedded within a web application scanner.

As use of Web 2.0 applications grows, their complex structure prevents HTML page analysis and complicates browser-level processing. Many Web 2.0 applications have minimally bootstrapped HTML code, which downloads the main code, for example, JavaScript (JS) code, which operates on the browsers Document Object Model (DOM) and JS structures directly, Asynchronous JS and XML (AJAX) calls, dynamically created links, DOM events, etc. Sometimes as the JS code is run, other HTML documents are not fetched during the application's lifetime.

One approach to crawling such heavily JS-based applications is to allow execution of the application within a standard browser engine, and then simulate user actions by sending mouse and keyboard events to the web application's user interface (UI) elements, soliciting evaluation of the JS code, which may change the web application's state and possibly provide information about the web application's attack vectors. However, such an approach is very time consuming, unreliable, and prone to "runaway scans." An example of a "runaway scan" is a scan of a "calendar" control found on a page: even through all the dates in the calendar are valid targets for scanner-generated events, attempted clicks on possible calendar dates will lead to essentially unlimited scan time. As such, advanced JS frameworks can use "event bubbling" extensively to consolidate event handlers, preventing the system from finding proper event targets, and most complicated widgets (e.g., calendars, schedule boards, trees, tables, etc.) may present too many actionable elements for the crawler to traverse in a manageable time.

Moreover, it is inefficient to perform exhaustive UI-level crawling by interacting with all UI components that are potential targets for user events. Certain UI elements within the application cannot be recognized as valid targets of events because event handlers belong to other elements within the application's structure (e.g., bottom up detection or bubbling of DOM events within modern browsers). Further, blanket saturation of an application's DOM elements by sending mouse and keyboard events is very time consuming, can break application logic, and is thus impractical. Also, a lack of knowledge of an application's logic does not allow proper interaction with complex UI controls. As such, these challenges prevent correct discovery of application surface through UI-based crawling, greatly diminishing the quality of automatic dynamic web application scanning.

Accordingly, various embodiments disclosed herein relate to simplifying an application's structure to list (e.g., graph or tree) actionable elements following a set of predefined rules, which treat applications written in specific ways differently. Using this approach, support can be provided for additional frameworks (e.g., jQuery, Dojo, etc.) to achieve a higher quality scan of the application and discovering vulnerabilities within previously hidden application states.

Advantages of the solution include creation of a simplified, but accurate representation of the application's structure. Usage of well-defined rule language to describe analysis procedures of specific kinds of applications and specific JS frameworks to achieve a high coverage of applications.

In order to discover the application attack surface, a web application scanner simulates user actions on a web application's UI elements. A DOM analyzer uses rules as further detailed in FIG. 2A to traverse the application's structure and to transform complex DOM into a concise list actionable tokens as further detailed in FIG. 2B. In certain examples, a token represents a DOM element that is a valid target for a mouse or keyboard event or a JS entity that may be invoked, evaluated, or modified in any other way.

Each rule can include or consist of a rule relevancy predicate that is used to check whether the rule should be activated on a specific frame of the web application. In some examples, the rules can be JS framework-specific, including version of JS being used. In one example, if a rule is active, all selectors for the rule are invoked. Each selector is then used in traversing the web application's DOM and JS structures to return a list of tokens. In another example, if a rule is active, selectors can be determined based on further analysis of the web application (e.g., from a cache of the web application). The further analysis is detailed herein.

In some examples, a selector is a technique or mechanism used to identify elements within a DOM that are of interest. In some examples, selectors can be built into a language used to describe the application, for example, Cascading Style Sheets (CSS) have built-in selectors. In the example of CSS, "." can be used to select classes while "#" can be used to select ids. With this approach, ".role" can be used to select every element in the DOM with a class of "role." In other examples, selectors can be generated by the rules. For example, the rules can write JavaScript or other scripts/code to return a set of selected elements as tokens.

In certain examples, a token represents a DOM element that is a valid target for a mouse or keyboard event or a JS entity that may be invoked, evaluated, or modified in any other way. A token includes a locator (e.g., a locator may be a simple XPath, a TruClient-specific locator, etc.) that can be used to retrieve the element and a list of actions that are permitted for the DOM or JS entity.

The relevant rules can be identified and then the associated selectors can be enabled. The DOM of the web application can then be analyzed using the selectors to generate the tokens. This expands crawl coverage of the application and discovers shorter business process paths within the application. The tokens can be sent to a scanner to scan the web application. During a scan, the tokens can be used by the web application scanner to locate relevant DOM objects/JS entities and activate them. This can be used to determine vulnerabilities and other information about the web application.

FIG. 1 is a block diagram of a computing system for analyzing the structure of a web application, according to one example. In this example, the computing system 100 can include a scanner 102 to simulate user actions on user interface elements of a web application 104. The web application 104 can be loaded in a browser layout engine 106 and analyzed by a document analyzer 108 according to a set of rules 110. One or more components of the computing system 100 can be implemented using at least one processor and memory. Further, one or more computers can be used to implement each of the components or each of the components can be implemented on a single computing system.

A scanner 102 can send a browser layout engine 106 a locator or identifier (e.g., a universal resource locator (URL)) of a web application 104. The browser layout engine 106 can load the web application 104, for example, load the web application 104 based on the URL. In some examples, a browser layout engine 106 can be a web browser or a modified browser configured to work as part of a scanner computing system 100. Examples of web applications 104 include calendar applications, email interfaces, news pages, other content resources such as streaming video, productivity applications, etc.

A scanner 102 can then simulate user actions on user interface elements of the web application 104. The simulation can be random or based on a predefined set. The simulation can occur while a document analyzer 108 traverses a structure of the web application 104. The simulation can be used to help the document analyzer 108 determine one or more rules to activate to generate actionable tokens.

As such, the document analyzer 108 traverses the structure of the web application 104 based on the rules to transform complex DOM of the web application 104 into a set of actionable tokens. The respective actionable tokens can include a portion of the web application that can change a user interface presented based on the web application 104. Examples of portions of the web application that can change a user interface can include targets for keyboard events, targets for click events, other actionable elements, etc. In some examples, actionable elements can include JavaScript objects.

In one example, the document analyzer 108 can determine, from the simulated actions, that a particular type of framework is present on the web application 104. In one example, a framework is an abstraction in which software providing generic functionality can be selectively changed by user code to provide application specific software. This can occur by determining that a selector associated with the framework is present using the simulated actions. Multiple frameworks can be determined based on this approach. Examples of web frameworks include jQuery, YUI Lobrary, Dojo Toolkit, MooTools, Prototype JS Framework, Ajax, Web Accessibility Initiative (WAI)—Accessible Rich Internet Applications (ARIA), and Flash, Frameworks can further be granulated into versions because version changes can affect capabilities and selectors associated.

A set of selectors can be enabled for each framework identified. In one example, some default selectors can also be enabled. In another example, when a framework is identified all associated selectors can be enabled. In yet another example, when a selector associated with the framework is identified, the framework is identified.

Moreover, selectors can be filtered based on content that can be searched about the web application 104. For example, knowing the way jQuery stores information about selectors, the document analyzer 108 can obtain a list of selectors by querying jQuery's cache structure. The cache structure can change based on jQuery release.

In one example, to find the associated selectors, the document analyzer can evaluate JS code of jQuery.cache [window.document[jQuery.expando]]. The result can be an array of JS objects containing selectors for the DOM elements that are valid targets for mouse and/or keyboard events. This example can be based on jQuery 1.6. In jQuery 1.7, the internal structure is changed, thus, more complicated JS code can be written to get the associated elements. This type of code can be written specifically for specific types of frameworks. In certain examples, jQuery may be referred to as a framework and 1.6 and 1.7 referred to as versions or types of the framework. When a particular framework is found, the web application 104 can be analyzed for actionable tokens based on the specifics of the framework. Other approaches, such as processing of the web application code, can be used to determine the presence of a particular framework. Moreover, rules for the document analyzer 108 can be implemented to automatically detect one or more of the frameworks and fetch a list of relevant elements.

While analyzing the web application 104, one or more selectors are determined. As noted, the rules can be used to determine selectors that are generic, framework specific, or implementation specific (e.g., ones pulled out of cache). Then, the document analyzer 108 can use a tokenizing feature to attempt to find a role and location of activated selectors. Using the selectors, the document analyzer 108 and/or scanner 102 can look for tokens on the web application 104. As noted above, in certain examples, a token represents a DOM element that is a valid target for a mouse or keyboard event or a JS entity that may be invoked, evaluated, or modified in any other way. A set of tokens can be found for each of the selectors. In some examples, the set can be empty. The tokens can include a locator of the token and one or more roles or actions that can be performed on/by the token.

Thus, when implemented, the rules can activate at least one selector and the at least one selector can return at least one actionable token. Moreover, the respective actionable tokens can include an associated locator and a set of permitted actions associated with the respective actionable token. Further, when the document analyzer 108 determines that a particular type of code is executable on the web application (e.g., determination of a framework), the document analyzer 108 can determine at least one of the permitted actions based on the particular type of code (e.g., framework). This can occur, for example, by enabling associated selectors and then attempting to find tokens and elements based on the selectors.

As shown, the set of tokens can be sent to a scanner 102 for scanning the web application 104. In one example, the scanner 102 can be the same scanner used to simulate user actions. In another example, the scanner can be another scanner. The scanner can include an event handler to consume the actionable tokens. Further, the scanner can use the actionable tokens to determine a set of tests to execute on the web application 104. The scanner can execute the tests on the web application based on the actionable tokens by executing, for each of the actionable tokens, a test located based on the respective locator and the respective permitted actions at the locator.

A processor, such as a central processing unit (CPU) or a microprocessor suitable for retrieval and execution of instructions and/or electronic circuits can be configured to perform the functionality of any of the components described herein. In certain scenarios, instructions and/or other information, such as tokens, web applications, rules, etc., can be included in memory. Each of the components may include, for example, hardware devices including electronic circuitry for implementing the functionality described herein. In addition or as an alternative, each component may be implemented as a series of instructions encoded on a machine-readable storage medium and executable by a processor. It should be noted that, in some embodiments, some modules are implemented as hardware devices, while other modules are implemented as executable instructions.

Figure 2A:
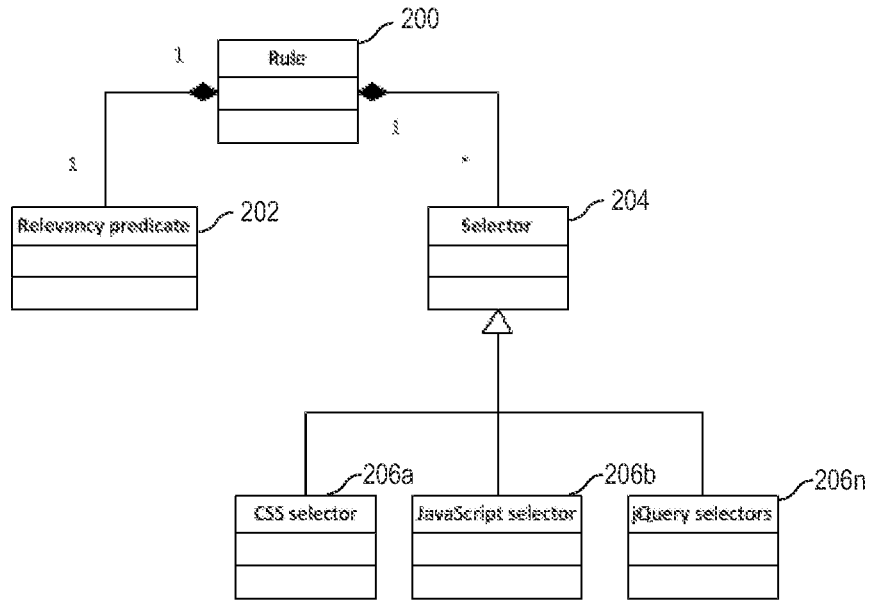
FIGS. 2A and 2B are block diagrams of rules and tokens, according to various examples.
Figure 2B:
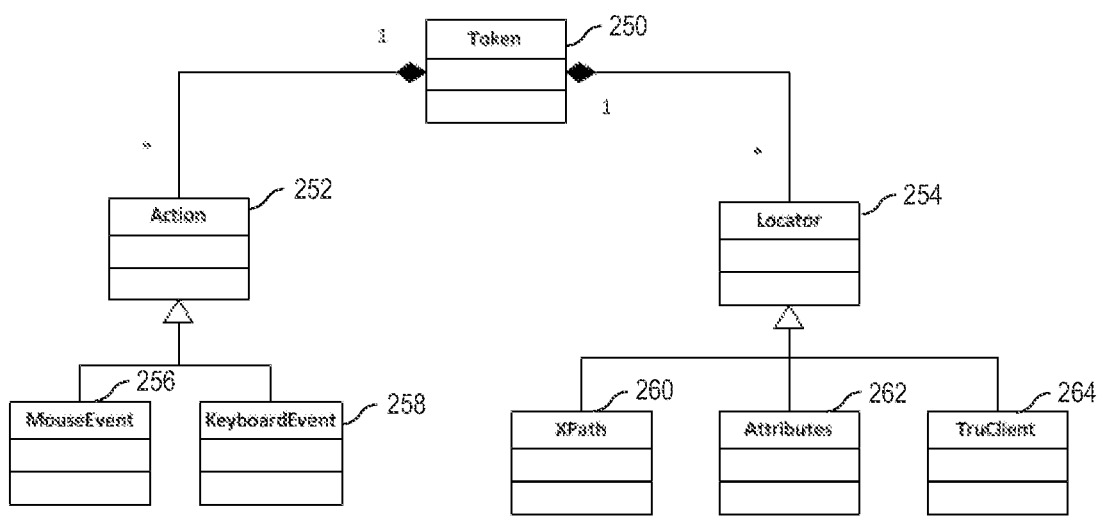

FIGS. 2A and 2B are block diagrams of rules and tokens, according to various examples. FIG. 2A shows a rule object 200. The rule object 200 can be a structure, a class, etc. Each rule can be associated with a relevancy predicate 202 and a selector 204. The selector 204 can include a set of one or more selectors 206a-206n. Selectors 204, 206a-206n examine the DOM and return sequences of actionable DOM entities. Not all of the selectors 206a-206n need be associated with a single rule. The relevancy predicate 202 is used to activate or deactivate the rule. In one example, crawling from a scanner while a document analyzer is executing on a web application can be used to determine whether a rule is relevant. In some examples, fingerprints can be left by one or more frameworks used on the web application. This can be analyzed to determine which rules are relevant to an application. In other examples, a scanner can crawl the application and randomly select an object on the application. The object can be analyzed to determine if a rule is relevant. Examples of selectors include a CSS selector 206a, a JavaScript selector 206b, and jQuery selectors 206n. In one example, a rule can be associated with a particular type of jQuery version. As such, when a rule is considered relevant, a jQuery cache can be examined to determine selectors to enable.

FIG. 2B shows a token object 250. The token object 250 can be a structure, a class, etc. The token object 250 can include one or more actions 252 as well as a locator 254. The token object 250 can define a DOM entity that should be target for action by the scanner. Location determination is possible through various mechanisms, for example, XPath 260, attributes 262 (e.g., ARIA), TruClient 264, etc. Operations or actions can vary based on DOM element. For example, an actionable token can be associated with a mouse event 256, a keyboard event 258, or other user interface changing event (e.g., executing JS code).

Figure 3:
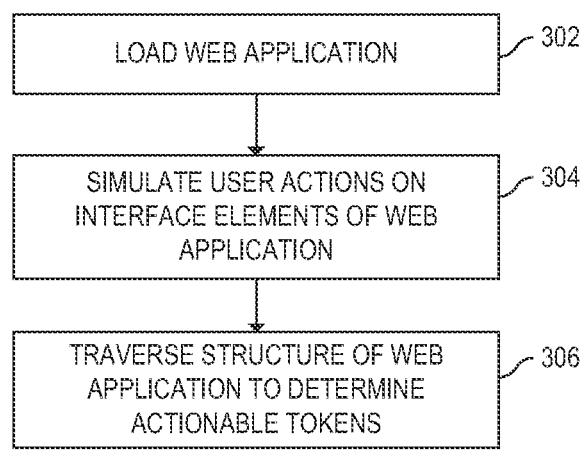
FIG. 3 is a flowchart of a method for analyzing the structure of a web application, according to one example.

FIG. 3 is a flowchart of a method for analyzing the structure of a web application, according to one example. Although execution of method 300 is described below with reference to computing system 100, other suitable components for execution of method 300 can be utilized (e.g., computing device 400). Additionally, the components for executing the method 300 may be spread among multiple devices. Method 300 may be implemented in the form of executable instructions stored on a machine-readable storage medium, such as storage medium 420, and/or in the form of electronic circuitry.

Method 300 can begin at 302 with a web application 104 being loaded into a browser layout engine 106. At 304, a scanner or other device/module can simulate a user's actions on user interface elements of the web application 104. In certain examples, user interface elements are constructs that can interact and/or define an appearance of an interface. Examples of user interface elements include windows, menus, icons, fields, controls, tabs, cursors, pointers, etc.

At 306 a document analyzer 108 can traverse a structure of the web application 104 based on rules and analyze complex DOM of the web application 104 to determine a set of actionable tokens. As noted above, the respective actionable tokens can include a portion of the web application 104 that can change a user interface presented based on the web application 104. The portion can include a valid target of a keyboard event, a click event, a JS entity that may be invoked, evaluated, or modified in any other way, or a combination thereof. Further, each of the actionable tokens can include a respective locator and a respective set of permitted actions.

As noted above, the document analyzer 108 can determine the actionable tokens by determining what rules should be enabled and determining selectors based on the enabled rules. Then, the document analyzer 108 can use the selectors to determine the tokens.

In certain examples, the tokens can then be provided to a scanner that can consume the tokens. The scanner consumes the actionable tokens to determine a set of tests to execute on the web application for each of the actionable tokens. The scanner then executes, for each of the actionable tokens, the respective set of tests located based on the respective locators and the respective permitted actions associated with the respective locators. As such, when conducting the tests, the scanner need not consume extra time attempting actions incompatible with the respective selectors.

Figure 4:
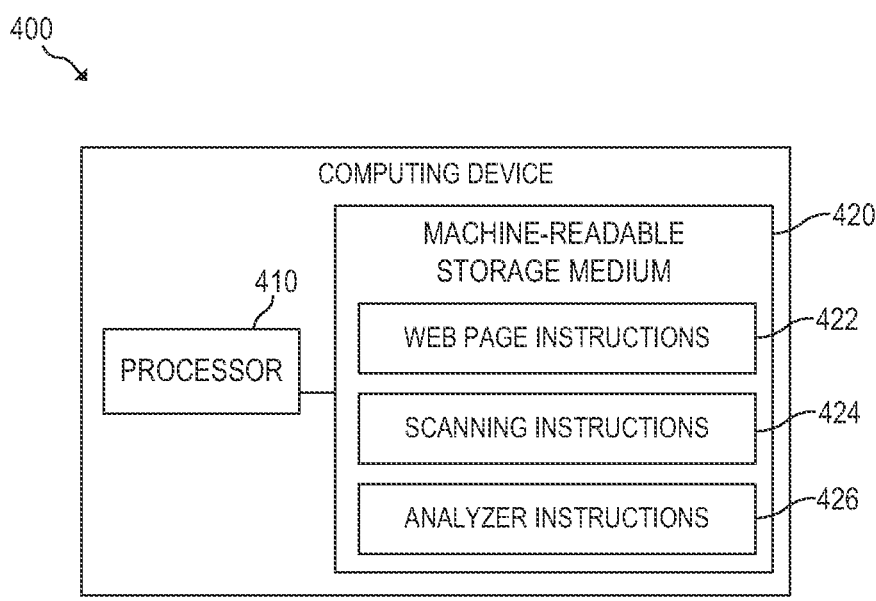
FIG. 4 is a block diagram of a device capable of analyzing the structure of a web application, according to one example.

FIG. 4 is a block diagram of a device capable of analyzing the structure of a web application, according to one example. The computing device 400 includes, for example, a processor 410, and a machine-readable storage medium 420 including instructions 422, 424, 426 for analyzing the structure of a web application. Computing device 400 may be, for example, a notebook computer, a slate computing device, a server, a workstation, a desktop computer, or any other computing device.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement analyze a DOM structure, for example, as implemented in method 300. As an alternative or in addition to retrieving and executing instructions, processor 310 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 320 may be encoded with a series of executable instructions for analyzing DOM structures.

Web page instructions 422 can be executed by the processor 410 to load a web application in a browser layout engine. Scanning instructions 424 can then be executed by the processor 410 to simulate user actions on user interface elements of the web application. The user actions can be done similarly to crawling a web page and can be random or based on an algorithm.

During the simulation of user activity, analyzer instructions 426 can be executed to determine one or more selectors associated with the web application. The analyzer can traverse a structure of the web application based on rules and the simulated user activity and analyze complex DOM of the web application to determine a set of actionable tokens. The respective actionable tokens can include a portion of the web application that can change a user interface presented based on the web application. Examples of the portion can include targets for a keyboard event, a click event, a JS event, or a combination thereof.

Further, the respective actionable tokens include a locator and a set of permitted actions. The locator can be based on one of various approaches (e.g., XPath, Attributes, TruClient, etc.). The permitted actions can be based on a type of framework used and/or the type/role of object the token is associated with.

Once tokens are generated, the tokens can be sent to a scanner. Scanning instructions 424 can be executed to consume the actionable tokens to determine a set of tests to execute on the web application. The scanner can execute, for each of the actionable tokens, a test located based on the respective locator and the actionable based on the respective permitted actions associated with the locator.

What is claimed is:
1. A system comprising:
   a processor;
   a browser layout engine executable on the processor to load a web application;
   a scanner executable on the processor to simulate user actions on user interface elements of the web application, to cause crawling of the web application, the crawling selecting objects of the web application; and
   a document analyzer executable on the processor to:
      identify, from the simulated user actions, first rules that are relevant to generate actionable tokens, wherein each respective rule of a plurality of rules includes a relevancy predicate, wherein the identifying of the first rules comprises activating the first rules that are relevant to the objects selected by the crawling based on the relevancy predicates of the first rules, and deactivating second rules that are not relevant to objects of the web application based on the relevancy predicates of the second rules,
      determine, from the simulated user actions, that a type of framework is present on the web application, the type of framework enabling selective changing of a functionality of the web application by a user code,
      enable selectors, that are specific to the type of framework, of the identified first rules, wherein the selectors examine a Document Object Model (DOM) of the web application and return sequences of actionable DOM entities, and
      cause traversal of a structure of the web application by the enabled selectors to transform the DOM into the actionable tokens each including a portion of the web application that changes a user interface presented based on the web application.

2. The system of claim 1, wherein the portion includes a valid target of at least one of: a keyboard event, a click event, and a JavaScript object.

3. The system of claim 1, wherein a first actionable token of the actionable tokens represents a DOM element of the DOM, the DOM element being a target for a mouse or keyboard event, and a second actionable token of the actionable tokens represents a JavaScript entity of the web application.

4. The system of claim 3, wherein each respective actionable token of the actionable tokens includes a locator and a set of permitted actions.

5. The system of claim 4, wherein the scanner or another scanner includes an event handler to consume the actionable tokens, wherein the scanner or the other scanner is to use the actionable tokens to determine a set of tests to execute on the web application.

6. The system of claim 5, wherein the scanner or the other scanner is to execute the tests on the web application based on the actionable tokens by executing, for each of the actionable tokens, a test located based on the respective locator and the respective permitted actions at the locator.

7. The system of claim 4, wherein the document analyzer is executable on the processor to:
   determine a particular type of code that is executable on the web application; and
   determine at least one of the permitted actions based on the particular type.

8. A non-transitory machine-readable storage medium storing instructions that, if executed by at least one processor of a computing system, cause the computing system to:
   load a web application;
   simulate user actions on user interface elements of the web application, to cause crawling of the web application, the crawling selecting objects of the web application;

identify, based on the simulated user actions, first rules that are relevant to generate actionable tokens, wherein each respective rule of a plurality of rules includes a relevancy predicate, wherein the identifying of the first rules comprises activating the first rules that are relevant to the objects selected by the crawling based on the relevancy predicates of the first rules, and deactivating second rules that are not relevant to objects of the web application based on the relevancy predicates of the second rules;

determine, from the simulated user actions, that a type of framework is present on the web application, the type of framework enabling selective changing of a functionality of the web application by a user code;

enable selectors, that are specific to the type of framework, of the identified first rules, wherein the selectors examine a Document Object Model (DOM) of the web application and return sequences of actionable DOM entities; and traverse a structure of the web application by the enabled selectors to transform the DOM into the actionable tokens each including a portion of the web application that changes a user interface presented based on the web application.

9. The non-transitory machine-readable storage medium of claim 8, further comprising instructions that, if executed by the at least one processor, cause the computing system to:

consume the actionable tokens to determine a set of tests to execute on the web application; and execute, for each of the actionable tokens, a test located based on a respective locator and respective permitted actions associated with the locator.

10. The non-transitory machine-readable storage medium of claim 8, wherein the portion includes a valid target of a JavaScript object.

11. A method comprising:

loading, by a system comprising a processor, a web application;

simulating, by the system, user actions on user interface elements of the web application, to cause crawling of the web application, the crawling selecting objects of the web application;

identifying, by the system based on the simulated user actions, first rules that are relevant to generate actionable tokens, wherein each respective rule of a plurality of rules includes a relevancy predicate, wherein the identifying of the first rules comprises activating the first rules that are relevant to the objects selected by the crawling based on the relevancy predicates of the first rules, and deactivating second rules that are not relevant to objects of the web application based on the relevancy predicates of the second rules; and determining, by the system from the simulated user actions, that a type of framework is present on the web application, the type of framework enabling selective changing of a functionality of the web application by a user code;

enabling selectors, that are specific to the type of framework, of the identified first rules, wherein the selectors examine a Document Object Model (DOM) of the web application and return sequences of actionable DOM entities; and traversing, by the system, a structure of the web application based on the identified first rules to transform the DOM into the actionable tokens each including a portion of the web application that changes a user interface presented based on the web application.

12. The method of claim 11, further comprising:

consuming the actionable tokens to determine a set of tests to execute on the web application for each of the actionable tokens; and executing, for each of the actionable tokens, the respective set of tests located based on a respective locator and respective permitted actions associated with the respective locator.

13. The method of claim 11, wherein the portion includes a valid target of at least one of: a keyboard event or a click event.

* * * * *